(12) United States Patent
Fukagawa et al.

(10) Patent No.: US 6,671,469 B1
(45) Date of Patent: Dec. 30, 2003

(54) SUPERVISORY APPARATUS FOR TRANSMISSION LINES

(75) Inventors: Takashi Fukagawa, Kawasaki (JP); Satoshi Kumano, Kawasaki (JP); Noboru Terai, Kawasaki (JP); Katsuhiro Oki, Kawasaki (JP); Takatsugu Kurokawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/499,728

(22) Filed: Feb. 8, 2000

(30) Foreign Application Priority Data

Feb. 8, 1999 (JP) .............................. 11-030629

(51) Int. Cl.[7] .............................................. H04B 10/17
(52) U.S. Cl. .............................. 399/30; 398/37; 398/16; 398/11

(58) Field of Search .............................. 359/110; 398/30, 398/37, 16, 11, 181

(56) References Cited

U.S. PATENT DOCUMENTS 5,278,892 A * 1/1994 Bolliger et al. ............. 455/442
6,496,300 B2 * 12/2002 Kinoshita et al. ........... 359/161

* cited by examiner

*Primary Examiner*—Leslie Pascal
*Assistant Examiner*—David Payne
(74) *Attorney, Agent, or Firm*—Staas & Halsey LLP

(57) ABSTRACT

A supervisory apparatus able to prevent recirculation of a supervisory frame when sending a supervisor frame for supervision, which supervises an optical communications apparatuses connected to transmission lines in cooperation with the same by adding a sequence number to a supervisory frame when sending the supervisory frame.

8 Claims, 14 Drawing Sheets

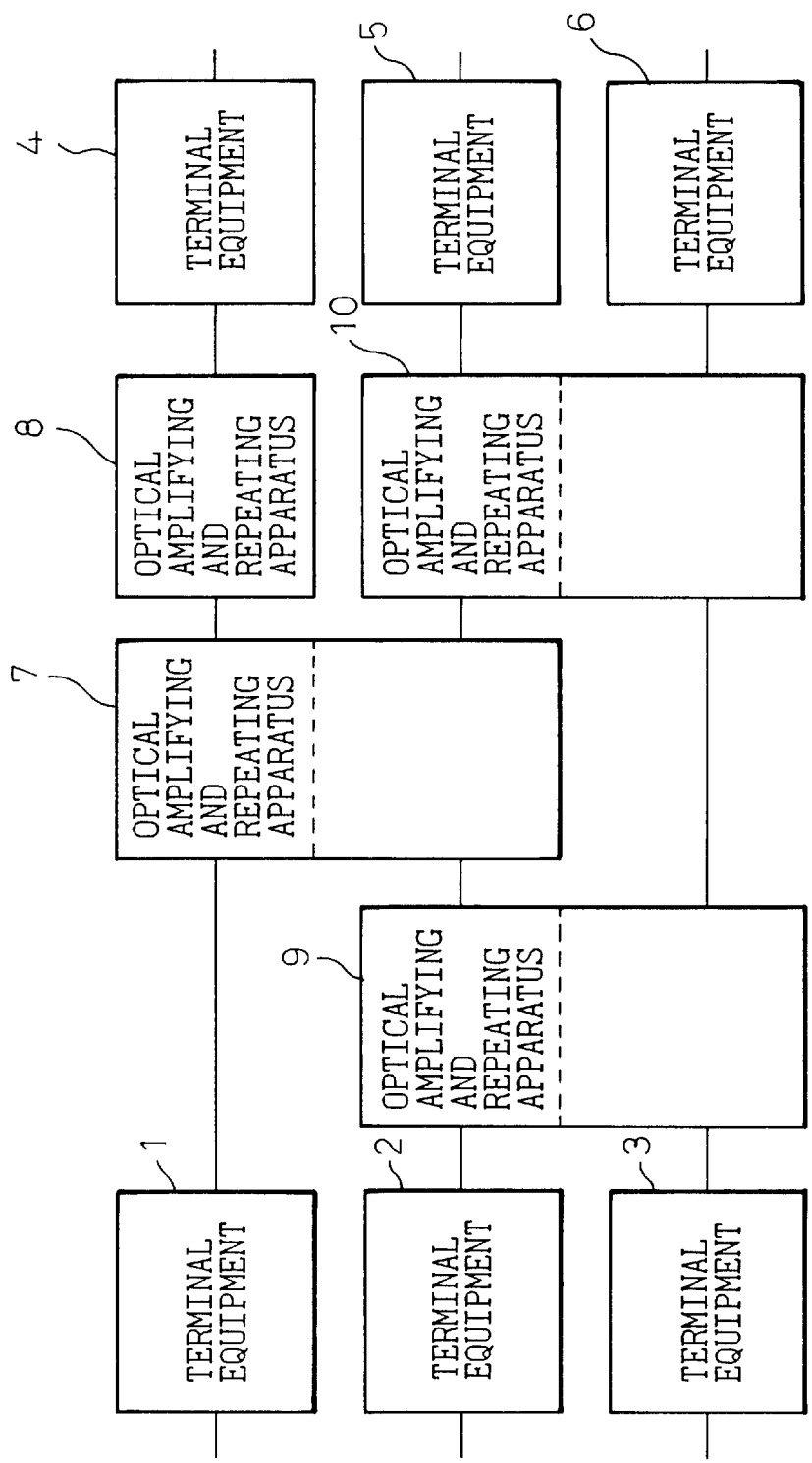

— : FLOW OF FRAME
○ : FETCH OF FRAME

— : FLOW OF FRAME
○ : FETCH OF FRAME
✕ : DISCARD OF FRAME

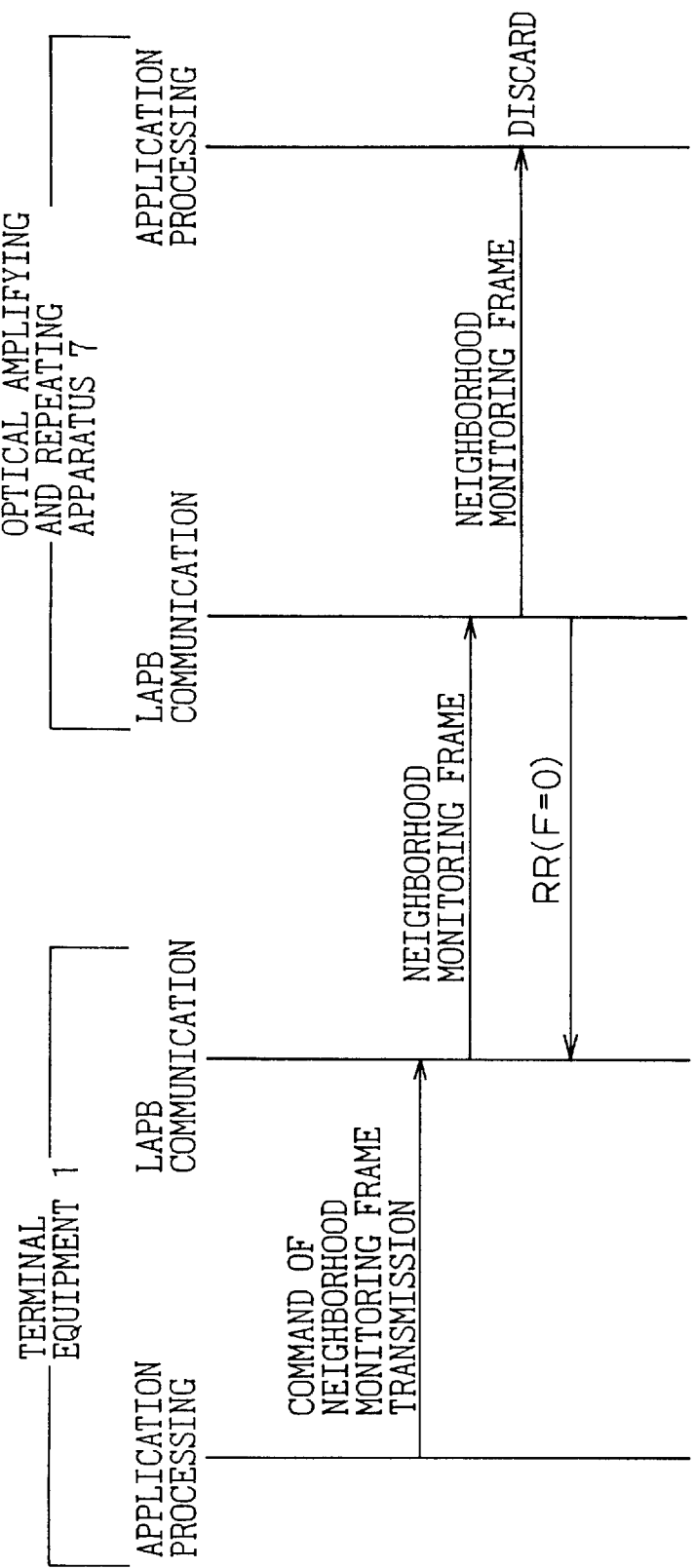

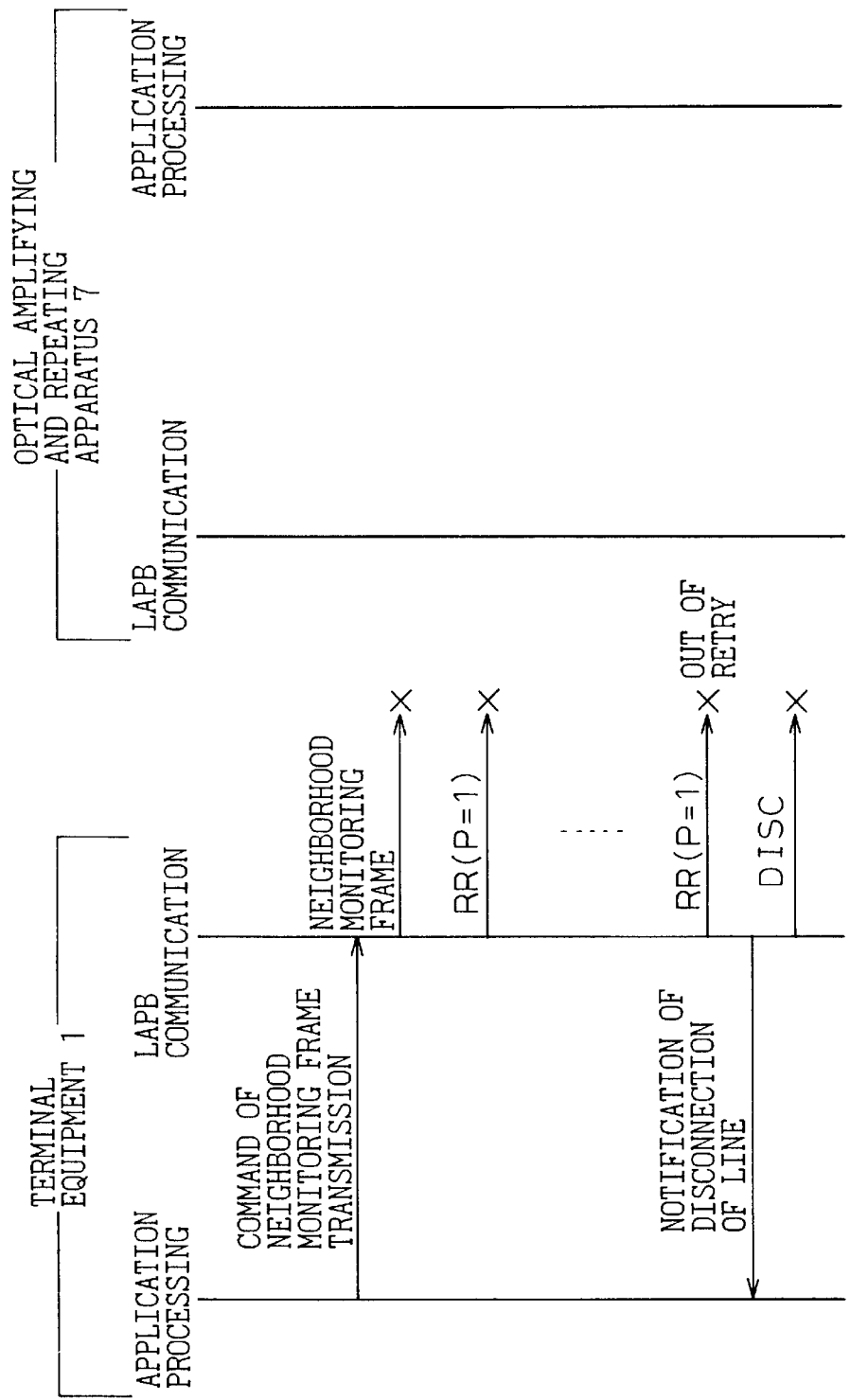

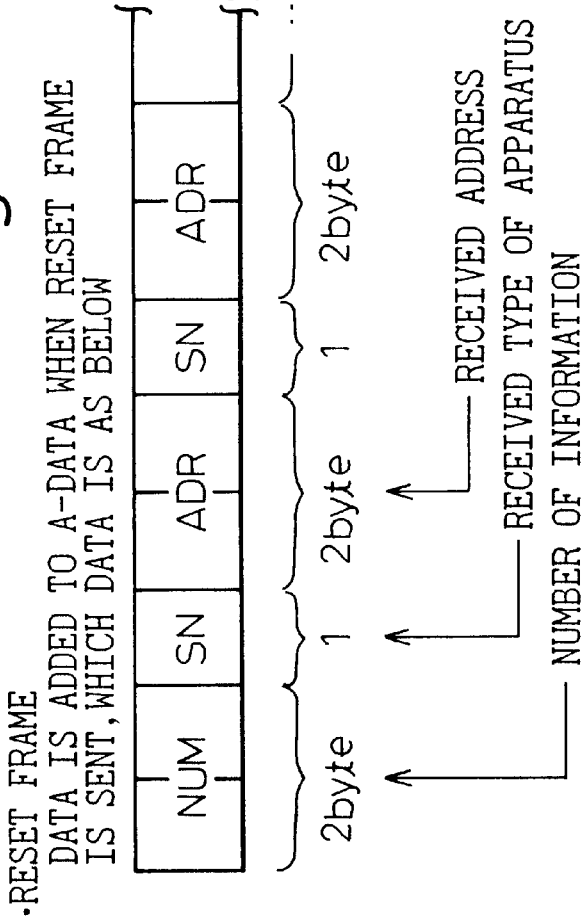

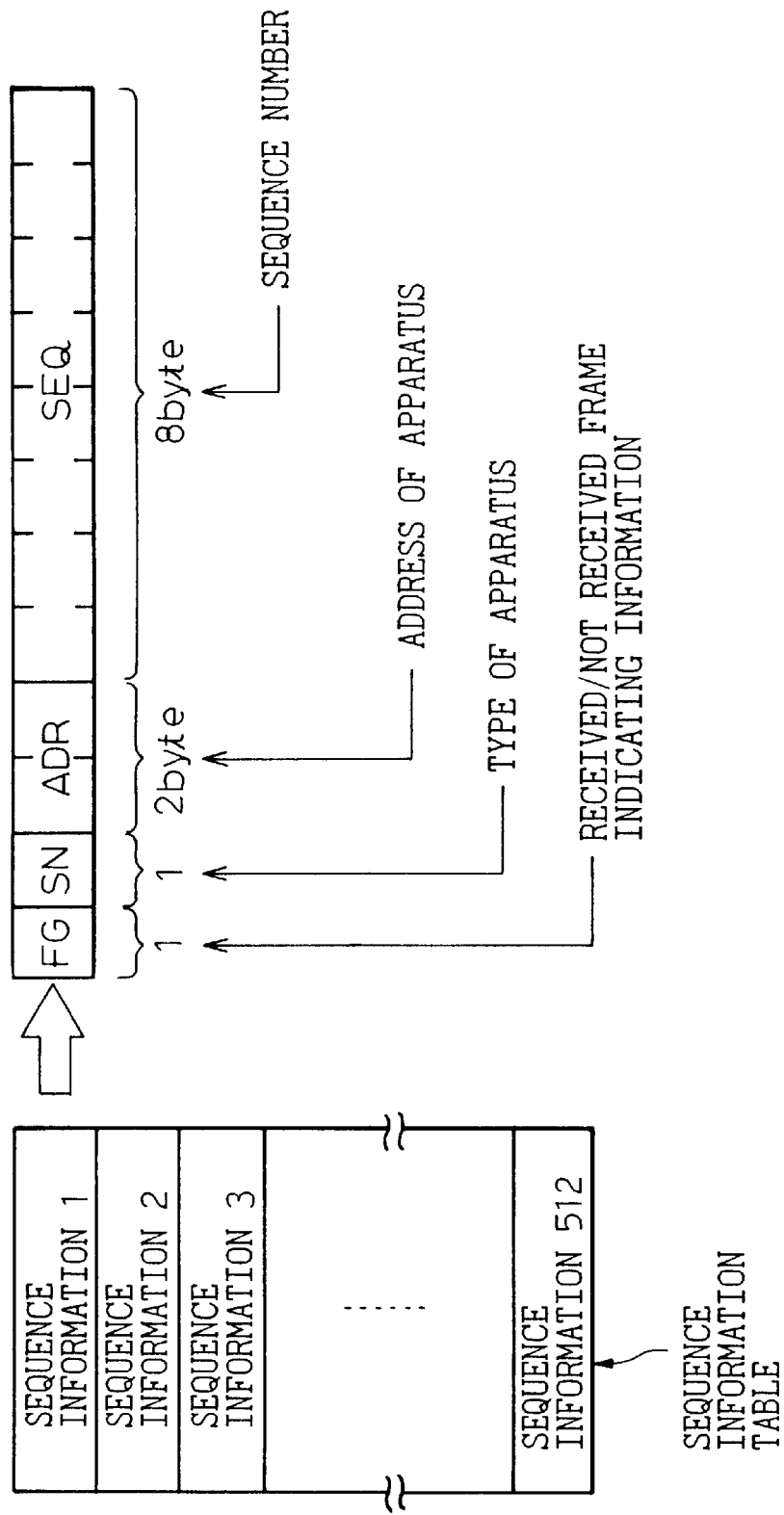

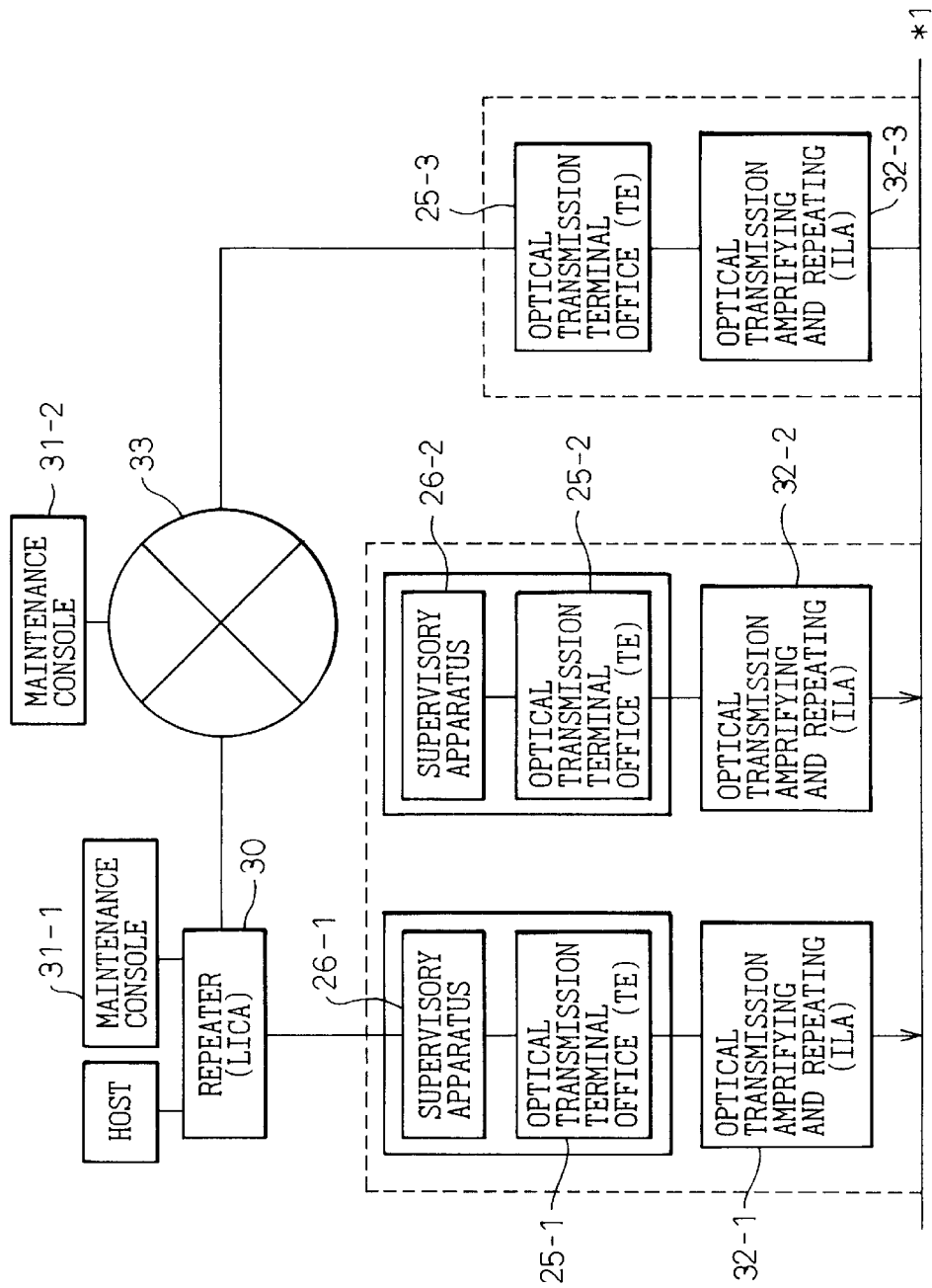

SUPERVISORY APPARATUS FOR TRANSMISSION LINES

CROSS-REFERENCE TO RELATED APPLICATIONS

This application is based on, and claims priority to, Japanese patent application 11-030629, filed Feb. 8, 1999, in Japan, and which is incorporated herein by reference.

This application is related to U.S. patent application Ser. No. 09/093,410, filed Jun. 6, 1998, and which is incorporated herein by reference.

This application is related to U.S. patent application Ser. No. 09/093,413, filed Jun. 6, 1998, and which is incorporated herein by reference.

BACKGROUND OF THE INVENTION

1. Field of the Invention

The present invention relates to a supervisory apparatus for transmission lines in a terminal office transmitting and receiving an optical signal and an optical amplifying and repeating apparatus or other optical communication apparatus used in an optical transmission system performing optical communication.

2. Description of the Related Art

One of the methods of detecting the status of optical communication apparatuses in transmission lines is to add the times at the apparatuses when transmitting information on faults occurring in the optical communication apparatuses.

In this method, an optical communication apparatus writes fault information in a supervisory frame when receiving that fault information and manages the times written in the frames for the sender apparatuses.

It compares the time written in a frame,describing fault information and the times of sender apparatuses which itself manages and discards the frame when the time in the frame is smaller than or equal to the times of the sender apparatuses.

That is, each apparatus has a fixed area for managing the times in the frames to judge if a frame has already been received.

To reset the above fault information, a fixed information region is added to a frame carrying the reset information for resetting the fault information. An optical communication apparatus receiving the reset frame avoids recirculation of the frame by adding to the information region information showing the completion of reception.

Summarizing the problems to be solved by the invention, in the past, the operation for discarding a frame describing fault information has been managed by time. Therefore, when the time at the optical communication apparatus changes, it is necessary to send a reset frame to update the time managed by the optical communication apparatus in the network.

Further, since it was necessary to match with the time in the network, the time had to be matched in the system in the network frequently. In this case, the frequent transmission of frames carrying reset information for all apparatuses resetting fault information at one time becomes a cause of line congestion.

In the information region fixedly defined in the reset frame, since there is a one-to-one correspondence between the information storage positions and number of the optical communication apparatus, it is necessary to enlarge the information region when giving optical communication apparatuses large numbers. Further, in a system not setting consecutive numbers for the optical communication apparatuses, unnecessary information is added.

SUMMARY OF THE INVENTION

An object of the present invention, in view of the above problems, is to eliminate the need for management of the times of supervisory apparatuses in a network.

Another object of the present invention is to simply prevent recirculation of frames.

A further object of the present invention is to enable, at all times, just the minimum necessary region to be held as the information region in a reset frame.

To attain the above objects, according to the present invention, there is provided a supervisory apparatus for supervising an optical communication apparatus connected to transmission lines, which supervisory apparatus add a sequence number when sending a supervisory frame.

BRIEF DESCRIPTION OF THE DRAWINGS

The above objects and features of the present invention will be more apparent from the following description of the preferred embodiments given with reference to the accompanying drawings, wherein:

FIG. 1 is a view of the network configuration in the present invention;

FIG. 9A and FIG. 9B are charts showing the establishment of sessions between apparatuses;

FIG. 10 is a view of the configuration of a reset frame;

FIG. 11 is a view of a sequence information table; and

FIGS. 12A and 12B are views of a supervisory network.

DESCRIPTION OF THE PREFERRED EMBODIMENTS

Figure 2A:
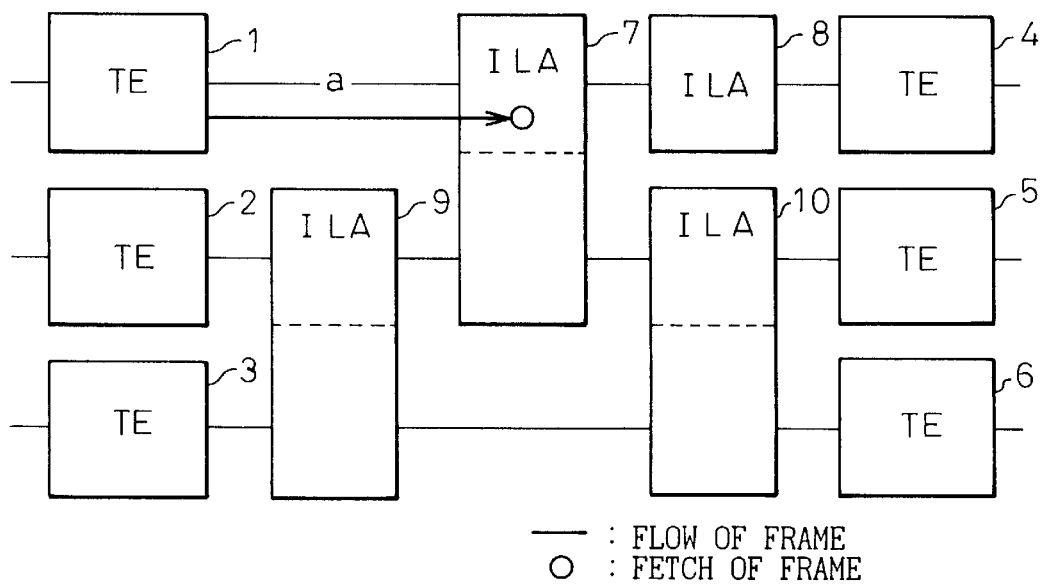
FIG. 2A and FIG. 2B are views for explaining the flow of a supervisory frame.

Preferred embodiments of the present invention will be described in detail below while referring to the attached figures.

First, a description will be given of the gist of four aspects according to the present invention.

According to a first aspect of the present invention, there is provided a supervisory apparatus, in an optical transmission system having a plurality of transmission lines connecting terminal offices point-to-point and optical amplifying and repeating apparatuses for performing optical amplifying and repeating operations in the transmission lines, which supervises the above constituents by communications among the terminal offices and optical amplifying and repeating apparatuses with adjoining offices and apparatuses. The supervisory apparatus transmits to the adjoining apparatuses supervisory frames while adding sequence numbers thereto which are updated each time a supervisory frame occurs when sending a supervisory frame, detects the sequence number in a supervisory frame to judge if the frame has already being received when receiving a supervisory frame from an adjoining apparatus, and then performs either processing for discarding or recirculating the supervisory frame or processing for updating the sequence number.

According to a second aspect of the present invention, there is provided a supervisory apparatus of the first aspect which transmits a supervisory frame including a reset frame for resetting the sequence number at the time of startup of the apparatus or at the time of overflow of the sequence numbers.

According to a third aspect of the present invention, there is provided a supervisory apparatus, cooperating with an optical communication apparatus transmitting, receiving, and relaying light in a transmission line and supervising the above constituents communications with adjoining optical communication apparatuses, which transmits to the adjoining apparatuses supervisory frames assigned sequence numbers which are updated each time a supervisory frame occurs when sending a supervisory frame, detects the sequence number in a supervisory frame to judge if the frame has already been received when receiving a supervisory frame from an adjoining apparatus, and then performs either processing for discarding or recirculating the supervisory frame or processing for updating the sequence number.

According to a fourth aspect of the present invention, there is provided a supervisory apparatus which supervises a plurality of transmission apparatuses provided in transmission lines, comprising at the supervisory apparatus side of a new transmission line a repeater for converting protocol for enabling control at a supervisory apparatus side of an existing transmission line as well when the supervisory protocols differ between the existing transmission line and new transmission line and for termination of control.

Next, detailed embodiments of the present invention will be explained with reference to the figures.

FIG. 1 shows the configuration of a network of the present invention.

In the figure, reference numerals 1 to 6 show terminal equipment, while reference numerals 7 to 10 show optical amplifying and repeating apparatuses.

The terminal equipment 1 and 4 are connected by an optical transmission line in which are inserted optical amplifying and repeating apparatuses 7 and 8.

The terminal equipment 2 and 5 are connected by an optical transmission line in which are inserted optical amplifying and repeating apparatuses 9, 7, and 10.

The terminal equipment 3 and 6 are connected by an optical transmission line in which are inserted optical amplifying and repeating apparatuses 9 and 10.

The optical amplifying and repeating apparatuses 9, 7, and 10 are each connected to two optical transmission lines, but these two transmission lines are separated by system. The apparatuses are designed to individually optically amplify and relay signals of the transmission lines.

The specific configuration of an optical amplifying and repeating apparatus will be explained later using FIG. 4.

Figure 2B:
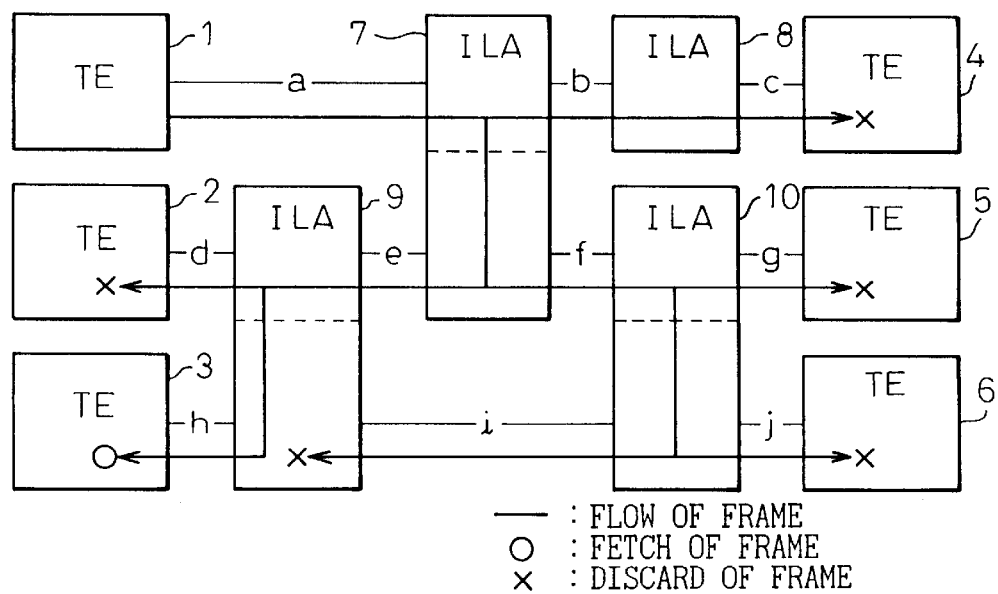

FIGS. 2A and 2B show the flow of supervisory frames for supervision between terminal equipment and optical amplifying and repeating apparatuses and other optical communication apparatuses.

FIG. 2A shows the case of supervision from terminal equipment (TE) 1 to an optical amplifying and repeating apparatus 7.

The terminal equipment 1 outputs a supervisory frame to the optical amplifying and repeating apparatus 7 through the transmission line a.

At this time, it adds a sequence number which is updated every time a supervisory frame is output.

The optical amplifying and repeating apparatus 7 receives the supervisory frame from the terminal equipment 1. In this case, since the destination address in the supervisory frame from the terminal equipment 1 is an address identifying the optical amplifying and repeating apparatus 7, the apparatus performs processing to fetch the frame.

FIG. 2B shows the case of supervision from the terminal equipment 1 to the terminal equipment 3.

a) The terminal equipment 1 transmits a supervisory frame to the transmission line a. At this time, it adds a sequence number which is updated each time a supervisory frame is output.

b) The optical amplifying and repeating apparatus 7 receiving the supervisory frame from the transmission line a transmits the received frame to the transmission lines b, e, and f since the destination address in the supervisory frame is not its address.

c) The optical amplifying and repeating apparatus 8 receiving the supervisory frame from the transmission line b transmits the received frame to the transmission line c since the destination address in the frame is not its address.

The terminal equipment 4 receiving the supervisory frame from the transmission line c discards (x) the supervisory frame since it is not addressed to it and there is no transmission line other than the receiving transmission line c.

The optical amplifying and repeating apparatus 10 receiving the supervisory frame from a transmission line f transmits the received frame to the transmission lines g, i, and j since it is not addressed to it.

The terminal equipment 5 and 6 receiving the frames from the transmission lines g and j discard the received frames for the same reason as explained for the case of the terminal equipment 4.

d) The optical amplifying and repeating apparatus 9 receives the same supervisory frame from the transmission lines e and i. At this time, since the sequence numbers of the supervisory frames are the same, the apparatus 9 discards the supervisory frame received later and transmits only the supervisory frame received first to the transmission lines d and h.

The terminal equipment 2 discards the supervisory frame received from the transmission line d for the same reason as explained with reference to the case of the terminal equipment 4.

e) The terminal equipment 3 receiving the frame from the transmission line h fetches the frame since the destination address in the supervisory frame designates the equipment 3.

That is, by confirming the destination address in the supervisory frame and the sequence number updated every time a supervisory frame is output, it is possible for terminal equipment to determine if a supervisory frame is addressed to it and then either fetch or further transfer the supervisory frame.

Figure 3:
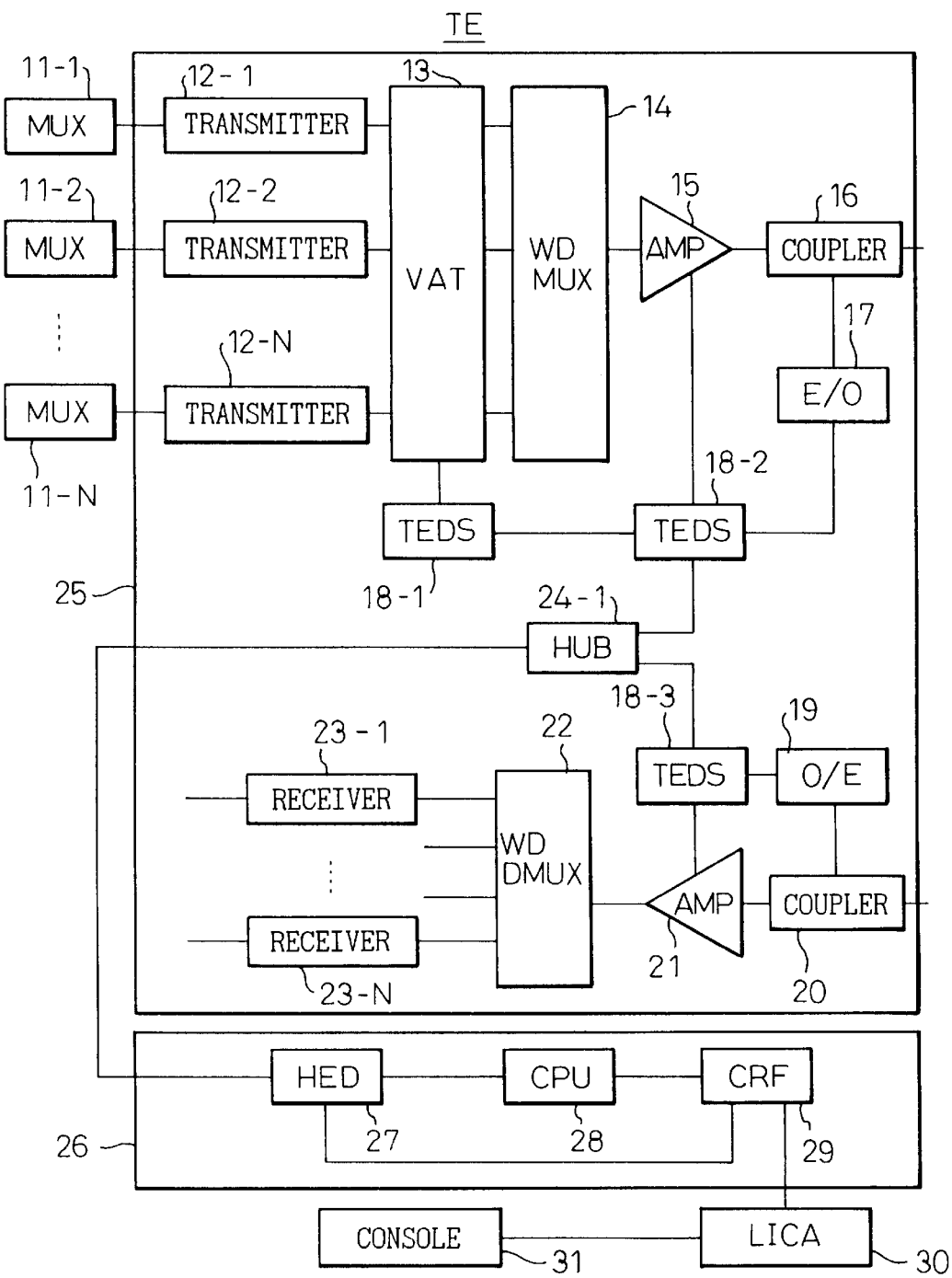
FIG. 3 is a view explaining terminal equipment.

FIG. 3 shows a specific example of the configuration of the terminal equipment 1 to 6 of FIG. 1.

In the FIGS., 11-1 to 11-N are lower multiplexers (MUX) which for example output 20 GHz, 2.4 GHz, 600 MHz, or other time-division multiplexed optical signals or electrical signals.

The optical transmitters 12-1 to 12-N convert the optical signals from the lower multiplexers 11-1 to 11-N to electrical signals, then convert them to light of a predetermined wavelength and output the result to the variable attenuator (VAT) 13. Conversely, when the signals output from the lower multiplexers 11-1 to 11-N are electrical signals, the signals are converted to light of a predetermined wavelength and the result is output to the variable attenuator (VAT) 13.

The variable attenuator (VAT) 13 is comprised by a plurality of variable optical attenuators for adjusting the levels of the light of the different wavelengths from the optical transmitters 12-1 to 12-N to predetermined levels.

The lights of the different wavelengths adjusted to predetermined levels at the variable attenuator (VAT) 13 are wavelength-division multiplexed at the wavelength-division multiplexer (WDMUX) 14 and the result is output to the optical amplifier (AMP) 15.

The optical amplifier 15 optically amplifies the wavelength-division multiplexed light from the wavelength-division multiplexer (WDMUX) 14 to a predetermined level.

The variable attenuator (VAT) 13 is connected to a supervisory signal processor (TEDS) 18-1, while the optical amplifier 15 is connected to a supervisory signal processor (TEDS) 18-2. TEDS is a name of the IC concerned.

The supervisory signal processor (TEDS) 18-1 detects the level of the optical signals of the different. wavelengths in the variable attenuator (VAT) 13 and supervises variable attenuator (VAT) 13 so that it becomes a predetermined level, detects the level of input from the optical transmitters 12-1 to 12-N, and generates alarm information informing the optical transmitters 12-1 to 12-N of the occurrence of a fault etc. and channel information showing the available wavelength.

Further, it controls the optical level when adjusting the wavelengths at the optical transmitters 12-1 to 12-N.

This information is output to the supervisory signal processor (TEDS) 18-2 to which the optical amplifier 15 is connected.

The supervisory signal processor (TEDS) 18-2 adjusts the gain of the optical amplifier 15 and performs control to amplify the wavelength-multiplexed light to a level corresponding to the number of wavelengths in service sent from the supervisory signal processor (TEDS) 18-1 and performs control to detect the output of the optical amplifier 15 and give a constant gain with respect to the wavelength of the wavelength-multiplexed light. Further, the supervisory signal processor 18-2 detects the input and output of the optical amplifier 15, generates supervisory information and fault information regarding the status of the optical amplifier 15, and transmits them to the interface (HUB) 24-1 along with the information prepared by the supervisory signal processor (TEDS) 18-1. HUB is a name of the IC concerned.

The supervisory signal processor (TEDS) 18-2 outputs an electrical signal for generating an optical supervisory channel (OSC) for supervising other terminal equipment and optical amplifying and repeating apparatuses in accordance with information from the interface (HUB) 24-1 to an electrical/optical converter (E/O) 17.

The electrical/optical converter (E/O) 17 converts the signal from the supervisory signal processor (TEDS) 18-2 from an electrical to an optical format and generates the optical wavelength of the optical supervisory channel (OSC). This is mixed with the wavelength-multiplexed light from the optical amplifier 15 at a photocoupler 16 and output the results to a transmission line.

The interface (HUB) 24-1 transmits the information from the supervisory signal processors (TEDS) 18-1 and 18-2 to the interface (HED) 27 by a predetermined transmission format. HED is a name of the IC concerned.

The interface (HED) 27 converts the information from the supervisory signal processors (TEDS) 18-1 and 18-2 to a format able to be processed by a controller (CPU) 28 and outputs it to the controller (CPU) 28.

The controller (CPU) 28 outputs control information for the supervisory signal processors 18-1 and 18-2 to the interface (HED) 27 so that the variable attenuator (VAT) 13 and optical amplifier 15 can perform predetermined operations in accordance with the status of the supervisory signal processors 18-1 and 18-2 based on the information from the supervisory signal processors 18-1 and 18-2.

Further, the controller (CPU) 28 prepares information to be inserted into the supervisory frame to notify terminal equipment and an optical amplifying and repeating apparatus of the status of its own office's equipment in accordance with the status of the supervisory signal processors (TEDS) 18-1 and 18-2 and the information to be transmitted to the repeater (LICA) 30 for relaying the information of the supervisory signal processors (TEDS) 18-1 to 18-2 to a maintenance console terminal 31 and outputs the information to the supervisory frame generator (CRF) 29. LICA is a name of the product concerned and CRF is a name of the unit concerned.

The supervisory frame generator (CRF) 29 terminates the protocol of the controller (CPU) 28 and performs processing for transfer of alarm and other supervisory information to be transferred between the repeater (LICA) 30 and controller (CPU) 28.

Further, the supervisory frame generator (CRF) 29 generates a supervisory frame having a neighborhood monitoring frame for supervising terminal equipment and an optical amplifying and repeating apparatus connected facing each other through a transmission line based on information from the repeater (LICA) 30 and controller (CPU) 28, generates in the supervisory frame a reset frame for resetting the sequence number to be given to a supervisory frame each time a supervisory frame is transmitted when the operating status of the variable attenuator (VAT) 13 and optical amplifier (AMP) 15 changes, and outputs these to the interface (HED) 27.

The interface (RED) 27 outputs the supervisory frame through the interface (HUB) 24-1 to the supervisory signal processor (TEDS) 18-2.

The supervisory signal processor (TEDS) 18-2 outputs the information of the supervisory frame from the supervisory frame generator (CRF) 29 and the signal. formed into frames by putting together the notification of the status of configuration of the optical amplifier 15 of the terminal equipment (whether it is in the automatic gain control status or constant level control status), the number of used wavelengths detected by the variable attenuator 13 and the information of the optical level, the information used for the order wire for contact, etc. through the electrical/optical converter (E/O) 17 and the photocoupler 16 to the transmission line.

On the other hand, an optical signal from other terminal equipment or optical amplifying and repeating apparatuses provided in the transmission lines is separated into light of the optical supervisory channel (OSC) and light carrying the actual transmission signals at the photocoupler 20. Further, the light of the optical supervisory channel (OSC) is output to the optical/electrical converter (O/E) 19 while the light carrying the actual transmission signal is output to the optical amplifier 21.

The optical amplifier 21 amplifies the light carrying the actual transmission signal to a predetermined optical level and outputs it to the wavelength-division demultiplexer (WDDMUX) 22. The The wavelength-division demultiplexer (WDDMUX) 22 splits the input optical signal into units of each wavelength and outputs them to the optical receivers RX23-1 to 23-N corresponding to the respective wavelengths.

The optical receivers RX23-1 to 23-N convert the light input from the wavelength-division demultiplexer (WDDMUX) 22 from an optical to electrical format.

The signal of the optical supervisory channel (OSC) input to the optical/electrical converter (O/E) 19 is input to the supervisory signal processor (TEDS) 18-3.

The supervisory signal processor (TEDS) 18-3 processes the signal of the optical supervisory channel (OSC), performs control for adjusting the gain of the optical amplifier 21 based on the information from the adjoining apparatus, and extracts the supervisory frame in the channel and outputs it to the interface (HUB) 24-1.

The interface (HUB) 24-1 converts the input to a predetermined format and outputs it to the interface (HED) 27.

The interface (HED) 27 outputs the signal of the predetermined format to the supervisory frame generator (CRF) 29.

The supervisory frame generator (CRF) 29 checks the address and checks the sequence number given each time a supervisory frame is transmitted.

When the above address is one's own address, the generator 29 checks the sequence number. If the received supervisory frame has not yet been received, it updates the sequence number table and fetches the data and converts it to a supervisory frame corresponding to the repeater (LICA) 30 and outputs it. Further, when the received supervisory frame has already been received, the generator discards it.

Further, when the address is for another terminal equipment or optical amplifying and repeating apparatuses, the generator 29 generates a supervisory frame and transmits it to the adjoining apparatus. At this time, if there is no adjoining apparatus other than the apparatus which sent the supervisory frame, the generator discards the supervisory frame.

When the supervisory frame includes a reset frame for resetting the sequence information, the sequence information table corresponding to the sender of the reset frame is updated. Since the reset frame is sent to another apparatus after updating, the generator generates a supervisory frame, outputs it to the interface (HED) 27, and further outputs it through the interface (HUB) 24-1, supervisory signal processor 18-2, electrical/optical converter 17, and photocoupler 16 to the transmission line.

At this time, when there is one adjoining terminal equipment or optical amplifying and repeating apparatus through the transmission line, the generator discards the frame in the same way as the case of the sequence number.

Figure 4:
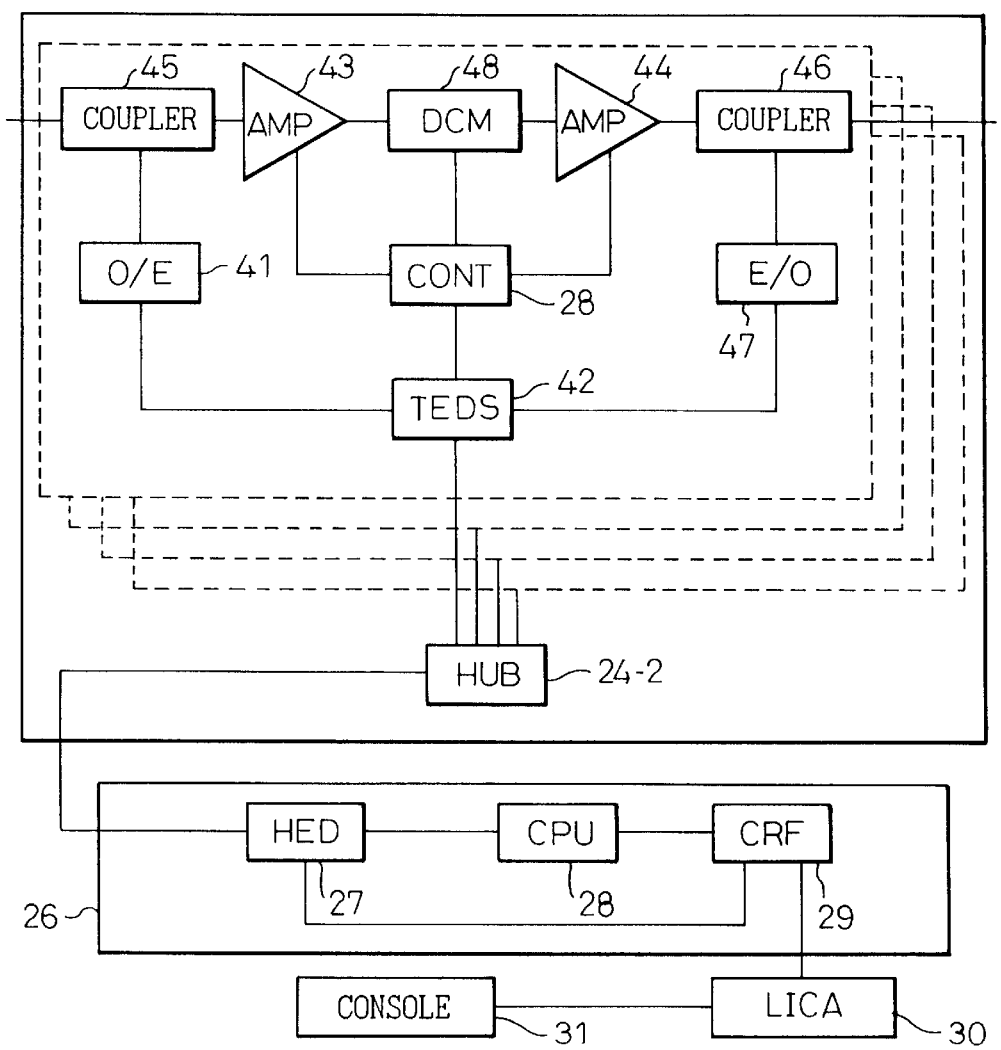
FIG. 4 is a view explaining an optical amplifying and repeating apparatus.

FIG. 4 shows one specific configuration of the optical amplifying and repeating apparatuses 7 to 10 of FIG. 1.

The photocoupler 45 fetches the light of the wavelength of the signal of the optical supervisory channel (OSC) from the wavelength-multiplexed light from the transmission lines, converts it from an optical to electrical format, and outputs the result to the supervisory signal processor (TEDS) 42. Light of other wavelengths is output to the optical amplifier 43.

The optical amplifier 43 amplifies the light by a predetermined gain and outputs the result to a dispersion compensation module (DCM) 48.

The dispersion compensation module 48 compensates for the dispersion of the transmission line and outputs the result to the optical amplifier 44.

The optical amplifier 44 amplifies the light by a predetermined, gain and outputs the result to the photocoupler 46.

The controller 28 generally adjusts the gains of the optical amplifiers 43 and 44 and performs automatic gain control to give a constant gain with respect to wavelength.

Further, the controller 28 switches from automatic gain control to automatic level control in accordance with the status of the optical amplifier of the optical amplifying and repeating, apparatus or terminal equipment of the preceding stage.

These switching operations are performed based on the signal in the optical supervisory channel from the supervisory signal processor (TEDS) 42 carrying the status of the optical amplifier of the supervisory signal processor (TEDS) connected to the terminal equipment or the optical amplifier of the optical amplifying and repeating apparatus of the preceding stage.

Further, the controller 28 supervises the status of the optical amplifiers 43 and 44 and notifies the result to the supervisory signal processor (TEDS) 42.

The supervisory signal process (TEDS) 42 outputs the information of the optical supervisory channel and the information relating to the optical amplifiers 43 and 44 from the controller 28 to the interface (HUB) 24-2.

The interface (HUB) 24-2 outputs the above information to the interface (HED) 27.

The interface (HED) 27 converts the information of the supervisory signal processor (TEDS) 42 of the HDLC format to a format which can be processed by the controller (CPU) 28 and outputs the result to the controller (CPU) 28.

The controller (CPU) 28 outputs to the interface (HED) 27 control information for the supervisory signal processor (TEDS) 42 so that the optical amplifiers 43 and 44 perform predetermined operations in accordance with the status of the supervisor signal processor (TEDS) 42 based on the information of the supervisory signal processor (TEDS) 42.

Further, the controller (CPU) 28 prepares (i) information for insertion into the supervisory frame for informing the terminal equipment and optical amplifying and repeating apparatus of the status of their own equipment in accordance with the status of the supervisory signal processor (TEDS) 42 and (ii) prepares information for sending the information of the supervisory signal processor (TEDS) 42 to the repeater (LICA) 30 for relaying to the maintenance console terminal 31 and outputs the prepared information to the supervisory frame generator (CRF) 29.

The supervisory frame generator (CRF) 29 terminates the protocol of the controller (CPU) 28, converts the protocol of the alarm and other supervisory information transferred between the repeater (LICA) 30 and controller (CPU) 28, and adjusts between differences in processing due to differences in protocol.

Further, the supervisory frame generator (CRF) 29 (i) prepares a supervisory frame having a neighborhood monitoring frame for supervising the terminal equipment and optical amplifying and repeating apparatus connected facing each other through a transmission line based on information from the repeater (LICA) 30 and controller (CPU) 28, (ii) generates in the supervisory frame a reset frame for resetting the sequence number to be given to a supervisory frame each time a supervisory frame is transmitted when the operating status of the optical amplifiers (AMP) 43 and 44 change, and outputs these to the interface (HED) 27.

Further, the supervisory frame generator (CRF) 29 checks the address of the supervisory frame contained in the optical supervisory channel from an adjoining terminal equipment or optical amplifying and repeating apparatus and checks the sequence number given each time a supervisory frame is transmitted.

When the above address is one's own address, the generator checks the sequence number. If the received supervisory frame has not yet been received, it updates the sequence number table, fetches the data, converts the protocol to the repeater (LICA) 30, and outputs it. Further, when the frame has already been received, it discards it.

Further, when the address is for another terminal equipment or optical amplifying and repeating apparatus, the generator generates a supervisory frame and transmits it to the adjoining apparatus.

When the supervisory frame includes a reset frame for resetting the sequence information, the sequence information table corresponding to the sender of the reset frame is updated. Since the reset frame is sent to another apparatus after updating, the generator generates a supervisory frame, outputs it to the interface (HED) 27, and further outputs it through the interface (HUB) 24-2, supervisory signal processor 42, electrical/optical converter 47, and photocoupler 46 to the transmission line.

Figure 5:
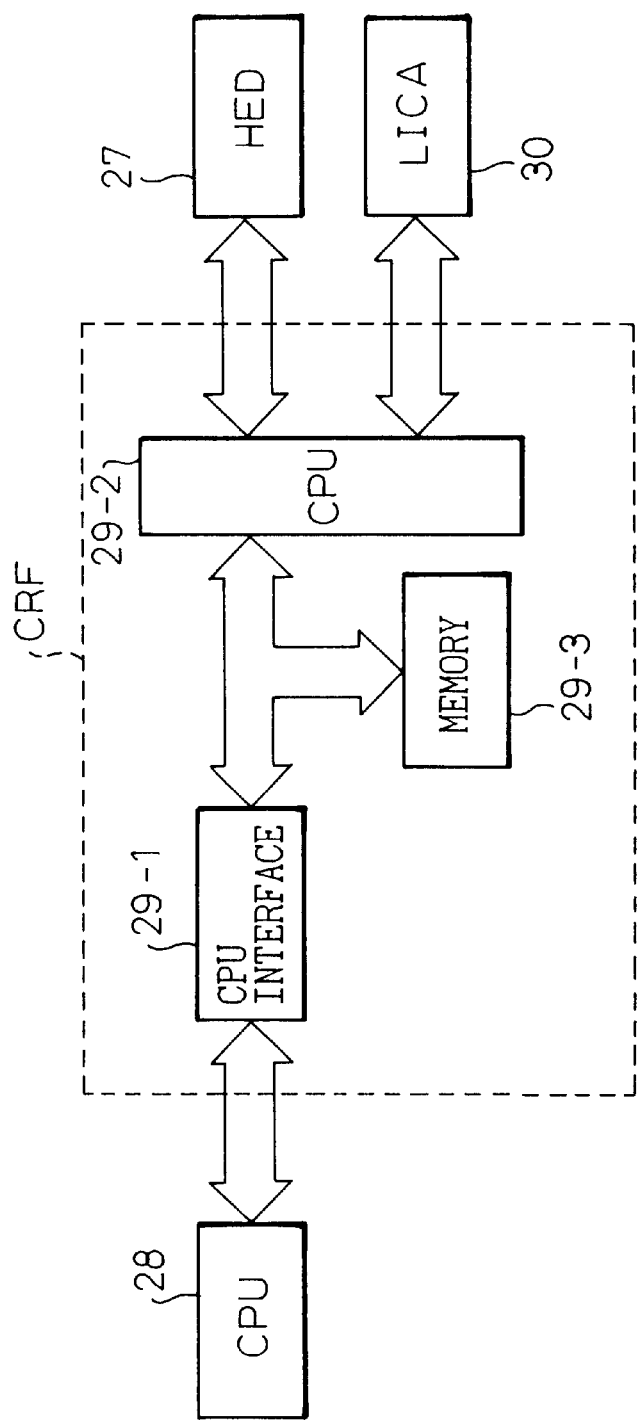
FIG. 5 is a view explaining a supervisory frame generator.

FIG. 5 shows the configuration of the supervisory frame generator (CRF) 29 in the supervisory apparatus 26 for supervising the terminal equipment and optical amplifying and repeating apparatus.

The supervisory frame generator (CRF) 29 is comprised of a CPU interface circuit 29-1, a memory 29-3, and a supervisory frame generation controller (CPU) 29-2. The interface circuit 29-1 is an interface circuit for connection with the CPU 28 (see FIG. 3 and FIG. 4).

The memory 29-3 stores a program for preparing the supervisory frame, the status information of its own equipment and the terminal equipment and optical amplifying and repeating apparatuses connected by the transmission line, and the sequence numbers in the supervisory frame from the terminal equipment and the optical amplifying and repeating apparatuses.

The supervisory frame controller 29-2 generates a supervisory frame upon request from the controller (CPU) 28 and repeater (LICA) 30 in accordance with the program in the memory 29-3 and outputs it to the interface (HED) 27, performs processing for receiving, transferring, and discarding the status of its own equipment received from the controller (CPU) 29-2 and the information of the supervisory frame of the terminal equipment and optical amplifying and repeating apparatus connected through the transmission line, manages the generation, updating, and resetting of sequence numbers given for each supervisory frame information for the processing for receiving, transferring, and discarding the information of the supervisory frames, and manages the transmission and reception addresses of the supervisory frames.

Figure 6:
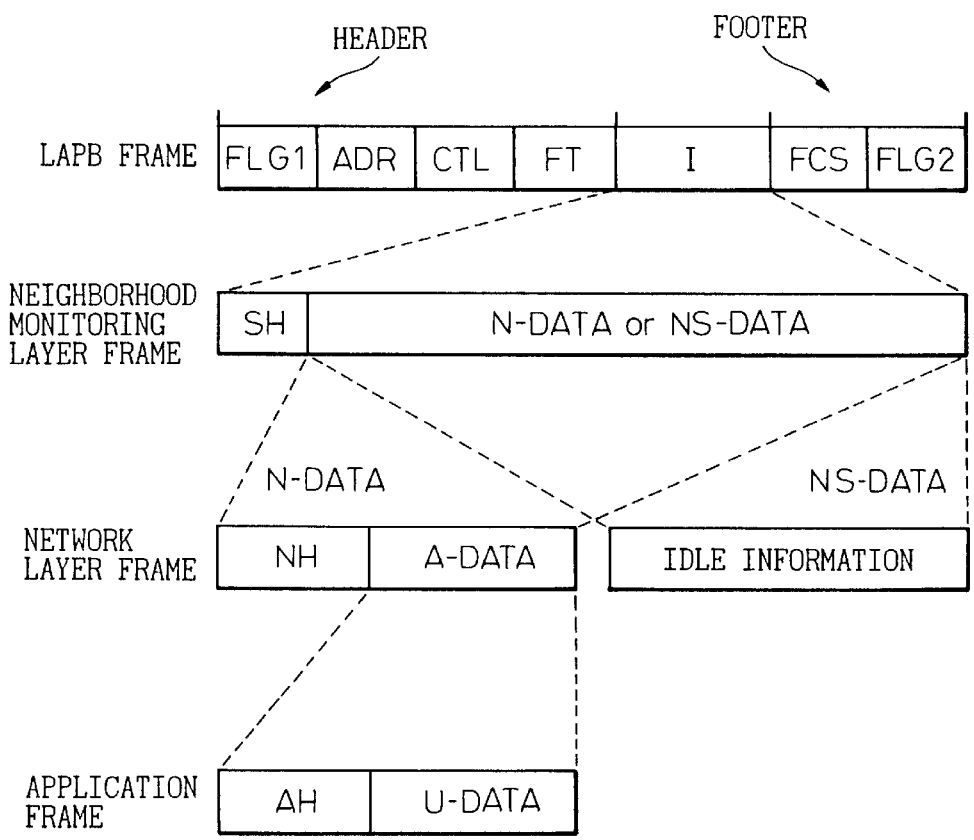
FIG. 6 is a view explaining the configuration of the supervisory frame.

FIG. 6 shows the configuration of the supervisory frame for alarm, supervision, and control prepared by the supervisory frame generator 29.

The LAPB frame constituting the supervisory frame generated by the supervisory frame generator 29 is comprised of a fixed pattern FLG1 showing the header of the frame, a destination address ADR, a control code CTL showing the priority of the frame or if a frame is a response frame, a frame type FT showing if the frame is a command transmission frame or an acknowledge ACK frame in response to a command, a neighborhood monitoring layer frame I required for monitoring of the adjoining terminal equipment and optical amplifying and repeating apparatuses, a frame check sum FCS, and a footer flag FLG2 showing the end of the frame.

The neighborhood monitoring layer frame I is comprised of a session head SH showing if a frame is an ordinary frame or a neighborhood monitoring frame and a network layer frame N-DATA or NS-DATA.

The network layer frame NS-DATA detects a disconnection of a session in supervisory frame LAPAB communication of the adjoining terminal equipment or optical amplifying and repeating apparatus at periodic cycles and carries no-session data.

The network layer frame N-DATA is comprised of a network layer frame header NH, explained later and shown in detail in FIG. 7, and an application layer frame.

The application layer frame is comprised of a region AH, explained later and shown in detail in FIG. 8, and U-DATA describing that content of the alarm and supervisory information.

Figure 7:
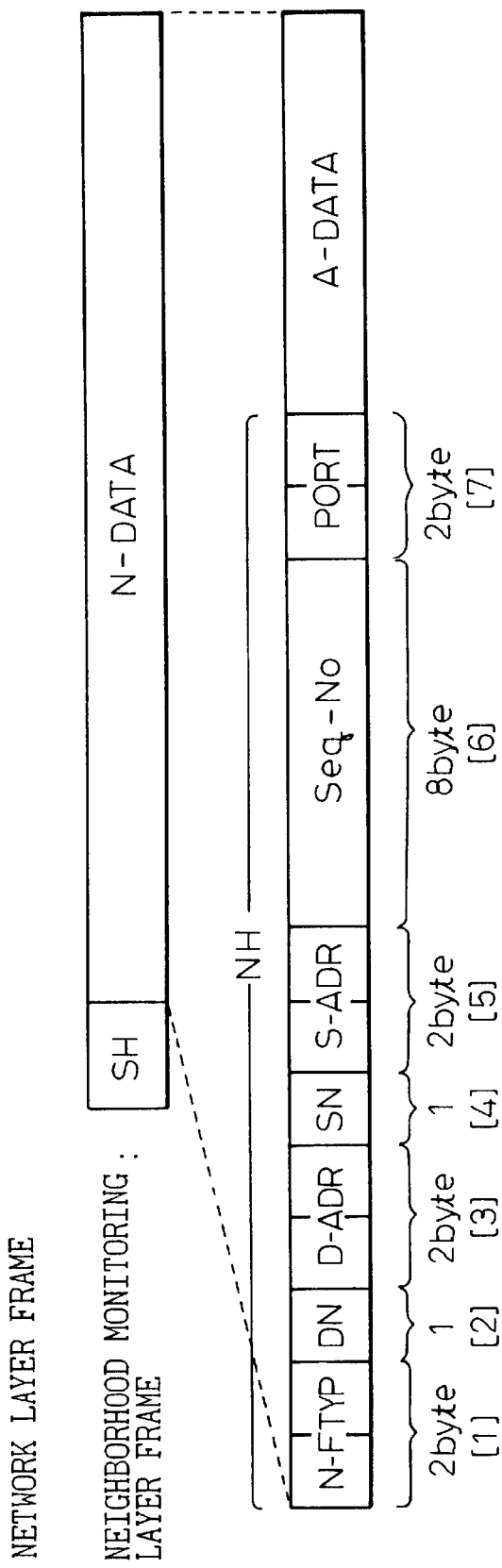
FIG. 7 is a view explaining a network layer frame.

FIG. 7 is a view explaining in detail the network layer frame header NH in the neighborhood monitoring layer frame.

The network frame layer type N-FTYP in the region NH provides information showing the network frame type, i.e., if the type of frame is an ordinary frame, an individual reset frame, or an overall reset frame.

The destination equipment type DN provides information showing the type of the destination, i.e., if the destination is terminal equipment (TE) or an optical amplifying and repeating apparatus (ILA), or a reset frame. ILA is an In-Line Amplifier.

The destination address D-ADR provides information showing if the address is for a destination of an individual terminal equipment (TE) or optical amplifying and repeating apparatus (ILA) or an address for sending the same information to all individual terminal equipment. (TE) and optical amplifying and repeating apparatuses ILA connected to all transmission lines and showing the standby state.

The sender equipment type SN provides information showing if the sender equipment is terminal equipment (TE) or an optical amplifying and repeating apparatus (ILA).

The sender address S-ADR describes the sender address.

The sequence number Seq-No carries the sequence number to be added each time a supervisory frame is transmitted.

The port type PORT describes an activation port, that is, the controller (CPU) or repeater (LICA) connected to the supervisory frame generator in the terminal equipment or optical amplifying and repeating apparatus to be controlled. Note that details of the bytes [1] to [7] in FIG. 7 are given below.

[1] Network frame type
Ordinary frame: 0x0000
Individual reset frame: 0x0100
Overall reset frame: 0x0101
[2] Destination equipment type
TE: 0x01
ILA: 0x02
In case of reset frame, 0x00 is set
[3] Destination address
Individual: value of 1 to 0 xfffe
Same information: 0xffff (current status, only reset frame)
System reserve: 0

Figure 8:
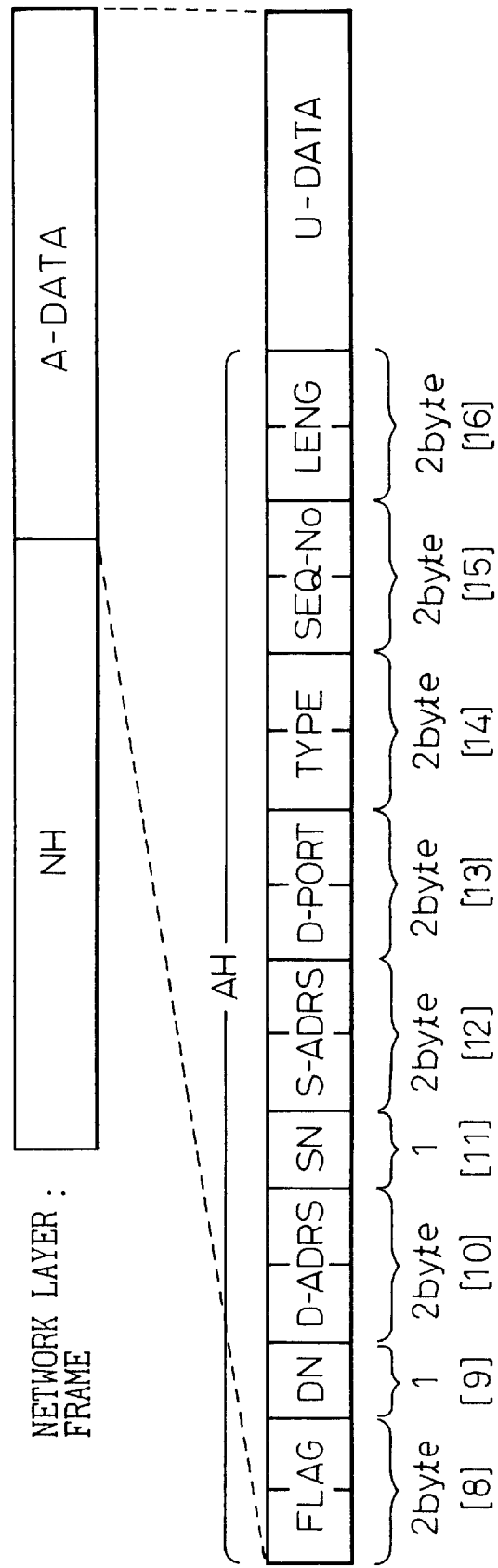
FIG. 8 is a view explaining an application layer frame.

[4] Sender equipment type
TE: 0x01
ILA: 0x02
[5] Sender address
Value of 1 to 0xfffe (0, 0xffff are system reserve)
[6] Sequence number
Value of 0 to 0xffffffff
* In case of reset frame, 0 is set
[7] Port type
CPU: 0x0001
CRAFT: 0x0002
Modem: 0x0003
10Base-T: 0x0004
* In case of reset frame, 0 is set The application layer frame A-DATA is comprised as shown in FIG. 8.

FIG. 8 is a view explaining details of A-DATA in he network layer frame.

The frame pattern FLAG gives the pattern showing the header of the frame.

The frame destination equipment type DN provides information showing the type of the destination of the supervisory frame, that is, if it is terminal equipment (TE) or an optical amplifying and repeating apparatus (ILA) or that it is a reset frame.

The frame destination address D-ADRS provides information showing if the destination address is for an individual terminal equipment (TE) or optical amplifying and repeating apparatus (ILA) or an address for sending the same information to all individual terminal equipment (TE) and optical amplifying and repeating apparatuses ILA connected to all transmission lines and showing the standby state.

The frame sender equipment type SN provides information showing if the sender equipment is a terminal equipment (TE) or optical amplifying and repeating apparatus (ILA) or a repeater (LICA) or a maintenance terminal.

The frame sender address S-ADR sets the unique number of the terminal equipment or optical amplifying and repeating apparatus to which the supervisory frame generator (CRF) is connected.

The activation port type D-PORT describes activation port, that is, the controller (CPU) or repeater (LICA). connected to the supervisory frame generator in the terminal equipment or optical amplifying and repeating apparatus to be controlled.

U-DATA type TYPE shows the type of the protocol of the supervisory information.

The sequence number SEQ-No shows the sequence number added each time a supervisory frame is transmitted.

The data length LENG of the U-DATA shows the length of the data of the supervisory information.

The U-DATA carries the actual supervisory command.

Note that details of the bytes [8] to [16] in FIG. 8 are given below.

[8] Frame pattern
Pattern showing header of frame: 0xf4el
[9] Frame destination equipment type
Setting similar to frame sender equipment type
[10] Frame destination address
Setting similar to frame sender address
[11] Frame destination address
Maintenance console 1: 0x01(set at LICA) to
Maintenance console 8: 0x08 (set at LICA)
LICA: 0x09
TE: 0x0a
ILA: 0x0b

[12] Frame sender address
LICA: number portion of SID (Sender ID) of WDM to be connected
Maintenance console: number portion of SID of WDM to be connected
IWP: number portion of SID of equipment
[13] Activation port
CPU: 0x0001 (set when LICA and maintenance console are sending)
CRAFT: 0x0002 (set by CPU)
Modem: 0x0003 (set by CPU)
10Base-T: 0x0004 (set by CRF)
* Indefinite value when LICA and maintenance console are receiving
[14] U-DATA type
TL-1: 0x0000
File: 0x0001
[15] Sequence number
Sporadic: 0x0000
Header: 0x1000
Middle: 0x0101 to 0x01ff
End: 0x11XX
Set by data length regardless of if U-DATA type is TL-1/file.
[16] Data length of U-DATA FIGS. 9A and 9B explain an example of control in the supervisory frame generator (CRF) when detecting disconnection of a session using the supervisory frame LAPB in the terminal equipment or optical amplifying and repeating apparatus adjoining a terminal equipment or optical amplifying and repeating apparatus to which the supervisory frame generator CRF belongs using as an example the terminal equipment 1 and optical amplifying and repeating apparatus 7 of FIG. 1.

FIG. 9A shows the sequence of normal operation of the terminal equipment 1 and the optical amplifying and repeating apparatus 7.

The supervisory frame generator (CRF) in the terminal equipment 1 executes processing of the application stored in the memory 29-3 of FIG. 5 through a controller (CPU) 29-2, sends a command for transmission of the neighborhood monitoring frame, sets the frame type FT of the supervisory frame LAPB of FIG. 6 to transmit by the command, describes that the frame is a neighborhood monitoring frame in the session head SH of the neighborhood monitoring layer frame, prepares the NS-DATA (no session data) in the network layer frame, and outputs the supervisory frame LAPB through the interface (HED) 27, interface (HUB) 24-1, supervisory signal processor (TEDS) 18-2, electrical/optical converter (E/O) 17, and photocoupler 16 (FIG. 3) to the transmission line as the optical supervisory channel OSC.

The optical amplifying and repeating apparatus 7 splits the optical supervisory channel OSC at the photocoupler 45 (FIG. 4) and inputs the results through the optical/electrical converter (O/E) 41, the supervisory signal processor (TEDS) 42, interface (HUB) 24-2, and interface (HED) 27 (FIG. 4) to the supervisory frame generator (CRF) 29.

The supervisory frame generator (CRF) 29 changes the frame type FT in the supervisory frame LAPB to an acknowledge ACK frame showing the response, changes the address ADR, and outputs the results through the interface (HED) 27, interface (HUB) 24-2, supervisory signal processor (TEDS) 42 of the optical amplifying unit on the downstream transmission line leading to a not shown terminal equipment 1, the electrical/optical converter (E/O), and the photocoupler to the downstream transmission line of the terminal equipment 1 as the optical supervisory channel (OSC).

Further, the supervisory frame generator (CRF) 29 does not perform internal processing since the neighborhood monitoring frame from the terminal equipment 1 indicates detection of disconnection of a session. The supervisory frame controller (CPU) 29-2 discards the supervisory frame from the terminal equipment 1 by the processing of the application in the memory 29-3 of FIG. 5.

The terminal equipment 1 receives as input the ACK frame from the downstream line through the photocoupler 20, optical/electrical converter 19, supervisory signal processor (TEDS) 18-3, interface (HUB) 24-1, and interface (HED) 27 at the supervisory frame generator (CRF) 29 (FIG. 3) and confirms at the supervisory frame generator (CRF) 29 that there is no disconnection of the session with the adjoining equipment.

This series of operations is executed periodically by operation of the supervisor frame controller (CPU) 29-2 using the information of the processing of the application in the memory 29-3 of FIG. 5.

FIG. 9B shows an example of the case of disconnection of the line between the terminal equipment 1 and the optical amplifying and repeating apparatus 7 of FIG. 1.

The supervisory frame generator (CRF) in the terminal equipment 1 executes the processing of the application stored in the memory 29-3 of FIG. 5 through the controller (CPU) 29-2, outputs a command for sending the neighborhood monitoring frame, prepares the neighborhood monitoring frame NS-DATA (no session data) of FIG. 6, prepares the LAPB frame, and outputs the same through the interface (HED) 27, interface (HUB) 24-1, supervisory signal processor (TEDS) 18-2, electrical/optical converter (E/O) 17, and photocoupler 16 to the transmission line as the optical supervisory channel (OSC).

The supervisory frame generator (CRF) performs the procedure for retransmitting the optical supervisory channel OSC at predetermined time intervals since it does not receive an acknowledge ACK frame returned from the optical amplifying and repeating apparatus 7. When no acknowledge ACK frame is returned from the optical amplifying and repeating apparatus 7 even after a predetermined number of tries, the supervisory frame generator (CRF) notifies the repeater (LICA) 30 and the controller (CPU) 28 of a line disconnection.

These operations are performed by all of the terminal equipment and optical amplifying and repeating apparatuses connected to the transmission lines of FIG. 1.

Next, an explanation will be given of the case where the supervisory frame generator (CRF) 29 handles an ordinary frame. When the supervisory frame generator (CRF) 29 handles an ordinary frame, there are four operational modes: the processing for transmission of an ordinary frame, the processing for reception of an ordinary frame, the processing for transmission of a reset frame, and the processing for reception of a reset frame.

Processing for transmission of ordinary frame The supervisory frame generator (CRF) checks the destination equipment type DN and destination address D-ADRS in the application layer frame received from the controller (CPU) or repeater (LICA) and if addressed to it, transmits them to the CPU. Note that an application frame addressed to oneself only arrives from the repeater (LICA).

If not addressed to itself, the supervisory frame generator (CRF) prepares a supervisory frame LAPB plus the network layer header NH by the following procedure and sends it to all of the transmission lines connected to the terminal equipment or optical amplifying and repeating apparatus.

a) Network frame type
The network frame type N-FTYP in the supervisory frame LAPB is set to an ordinary frame.

b) Destination equipment type
The destination equipment type in the application layer frame received from the controller (CPU) or repeater (LICA) is copied.

c) Destination address.
The destination address in the application layer frame received from the controller (CPU) or repeater (LICA) is copied.

d) Sender equipment type
The type of equipment of the sender is set.

e) Sender address
The address of the sender is set.

f) Sequence number
The sequence number of the sender managed in the supervisory frame generator (CRF) is incremented by one and the result is set. Note that when the sequence number after the incrementation exceeds the maximum value, the sequence number managed internally is set to 0 and it advances to the processing for sending a reset frame.

The newly set sequence number is set for the sequence number Seg-No in the network layer header NF.

g) Port type
The activation port in the application header received from the controller (CPU) or repeater (LICA) is copied and the following value is set for the activation port in the application header.
The number of the repeater (LICA) of the destination is set when the frame receiver is a repeater (LICA).
The number of the controller (CPU) of the destination is set when the frame receiver is a controller (CPU).
At this time, different values are set depending on the result of the processing by the controller (CPU).

h) The supervisor frame generator (CRF) adds the session head SH to the application layer frame A-DATA received from the controller (CPU) or repeater (LICA) and the network layer header NH prepared by the processing of a) to g) to prepare the supervisory frame LAPB and transmits this to the adjoining terminal equipment or optical amplifying and repeating apparatus on the transmission line connected to the terminal equipment or optical amplifying and repeating apparatus.

Processing for receiving ordinary frame
The processing inside the supervisory frame generator (CRF) when receiving light of an optical supervisory channel (OSC) carrying a supervisory frame from an adjoining terminal equipment or optical amplifying and repeating apparatus connected on the transmission line consists of the processing of the following a) to b).

a) The supervisory frame generator (CRF) obtains the sequence number corresponding to the sender equipment type and the sender address in the network layer frame received from the sequence numbers of the terminal equipment or optical amplifying and repeating apparatuses connected through the transmission lines managed inside the supervisory frame generator (CRF) and compares this with the sequence number in the supervisory frame LAPB.

If the sequence number managed inside the supervisory frame generator (CRF) is equal to or larger than the sequence number of the received supervisory frame LAPB, it discards the received supervisory frame LAPB.

If the sequence number managed inside the supervisory frame generator (CRF) is smaller than the sequence number inside the received supervisory frame or is the information of a new terminal equipment or optical amplifying and repeating apparatus not received in the past, it copies the sequence number inside the frame as the sequence number corresponding to the sender apparatus of the sequence number of the equipment and performs the following processing of b).

b) The supervisory frame generator (CRF) checks the destination equipment type DN and the destination address D-ADR and if not addressed to itself, transmits a supervisory frame in accordance with the procedure for transmission of an ordinary frame explained above to the adjoining terminal equipment or optical amplifying and repeating apparatus connected to the transmission line other than the receiving equipment or apparatus.

At this time, the sequence number of the equipment or apparatus of the supervisory frame generator (CRF) itself managed inside the generator is not added.

If addressed to itself, the supervisory frame generator (CRF) transmits the application frame to the port corresponding to the port type (controller CPU or repeater LICA) by the following procedure:

Processing for transmission of reset frame The supervisory frame generator (CRF) adds the data of FIG. 10 to the application layer frame A-DATA in the network layer frame under the following conditions and sends a supervisory frame containing the reset frame.

The application layer frame A-DATA of the reset frame is comprised of an information number NUM showing the number of information comprised of the received equipment type SN and received address ADR, the received equipment types SN, and the received addresses ADR.

The reset frame includes an individual reset frame and an overall reset frame.

The individual reset frame and overall reset frame are generated under the following circumstances:

a) Individual reset frame
When there is a request for transmission of an individual reset frame from the controller (CPU) at the time of startup of the equipment.
When the maximum value of the sequence number is exceeded after the sequence number of equipment of the supervisory frame generator (CRF) itself managed inside it is added.

b) Overall reset frame
When there is a request for transmission of a reset frame from the controller (CPU) at the time of startup of the optical supervisory channel (OSC).

At the time of the above states, the supervisory frame generator (CRF) adds a reset frame transmission trigger to the network layer header NH by the following procedure, then transmits a supervisory frame having a reset frame to the adjoining terminal equipment and optical amplifying and repeating apparatuses connected to all of the transmission lines to which that generator is connected.

a) Network frame type N-FTYP
The generator sets the network frame type N-FTYP to an individual reset frame or overall reset frame.

b) Destination equipment type DN
The generator writes information showing that the frame is a reset frame in the destination equipment type DN.

C) Destination address D-ADR
The generator then writes information showing a multicast in the destination address D-ADR.

d) Sender equipment type SN
The generator sets the sender equipment type SN showing the sender equipment.

e) Sender address S-ADR
The generator sets its own number portion in the sender address S-ADR.

f) Sequence number Seq-No
The generator sets 0 in the sequence number Seq-No. At this time, it also sets 0 for its own internally managed sequence number.

g) Port type PORT
The generator sets 0 for the port type PORT. Processing for receiving reset frame a) The supervisory frame generator (CRF) receives the optical supervisory channel OSC, checks the sender equipment type SN and sender address S-ADR of the neighborhood monitoring frame written in the supervisory frame in the optical supervisory channel OSC, and discards the frame if the frame is a supervisory frame which the generator itself has transmitted.

b) If not a supervisory frame which the generator itself has transmitted, the supervisory frame generator (CRF) checks the application layer frame A-DATA and discards the frame if the application layer frame A-DATA contains sender equipment type SN and address ADR indicating itself since it is a reset frame passing through itself once.

When the received supervisory frame is an individual reset frame, the supervisory frame generator (CRF) sets 0 for the sequence number corresponding to the sender equipment in the sequence numbers of equipment which it manages internally, adds its own equipment type SN and address ADR as such by the application layer frame A-DATA of the reset frame of FIG. 10, then transmits the frame to transmission lines other than the transmission line over which it received the frame.

When the received supervisory frame is an overall reset frame, the supervisory frame generator (CRF) deletes the sequence information of all equipment other than its own managed internally.

Further, the supervisory frame generator (CRF) adds its own equipment type SN and address ADR as shown by the application layer data A-DATA of the reset frame of FIG. 10, then transmits the frame to all transmission lines other than the transmission line over which it received the frame.

At this time, the supervisory frame generator (CRF) does not add its own internally managed sequence number.

The supervisory frame generator (CRF) registers and deletes sequence information by the joint action of the memory 29-3 and the supervisory frame controller (CPU) 29-2 of FIG. 5.The supervisory frame generator (CRF) 29-2 prepares a sequence information table in the memory 29-3 as shown in FIG. 11.

The FG in FIG. 11 means the frame reception/not reception information, SN the equipment type, ADR the equipment address, and SEQ the sequence number.

The sequence information is registered and deleted in the following way.

Registration of sequence information
The supervisory frame generator (CRF) prepares only its own sequence information at the time of startup of the equipment.

The sequence number at that time is set to "1".

When the supervisory frame generator (CRF) receives a supervisory frame from other equipment, it newly registers the sequence information if there is no information on the frame sender equipment in the sequence information which it manages.

The supervisory frame generator (CRF) copies the sequence number written in the received frame for the sequence number at that time.

Deletion of sequence information

The supervisory frame generator (CRF) internally manages the terminal equipment or an optical amplifying and repeating apparatus not receiving a frame for a long time and judges them as removed from the transmission line. It deletes the sequence information of that equipment.

The supervisory frame generator (CRF) holds the sequence information including the frame reception information.

The controller (CPU) requests the supervisory frame generator (CRF) to check the reception or not reception of a supervisory frame for example once an hour. The supervisory frame generator (CRF) receiving such a request checks the supervisory frame reception/not reception information and if judging that a supervisory frame was received deletes the sequence information.

Method of use of frame reception/not reception information

The supervisory frame generator (CRF), when there is a periodic request for a check from the controller (CPU), judges that a frame was received when the frame reception information FG is 0 and rewrites the information FG to 1.

Conversely, if 1, it judges that no frame was received and deletes the sequence information.

The supervisory frame generator (CRF), when receiving a supervisory frame from the adjoining terminal equipment and optical amplifying and repeating apparatus, sets 0 in the supervisory frame reception/not reception information for the equipment and records, in the table, the fact that a supervisory frame was received.

Figure 12B:
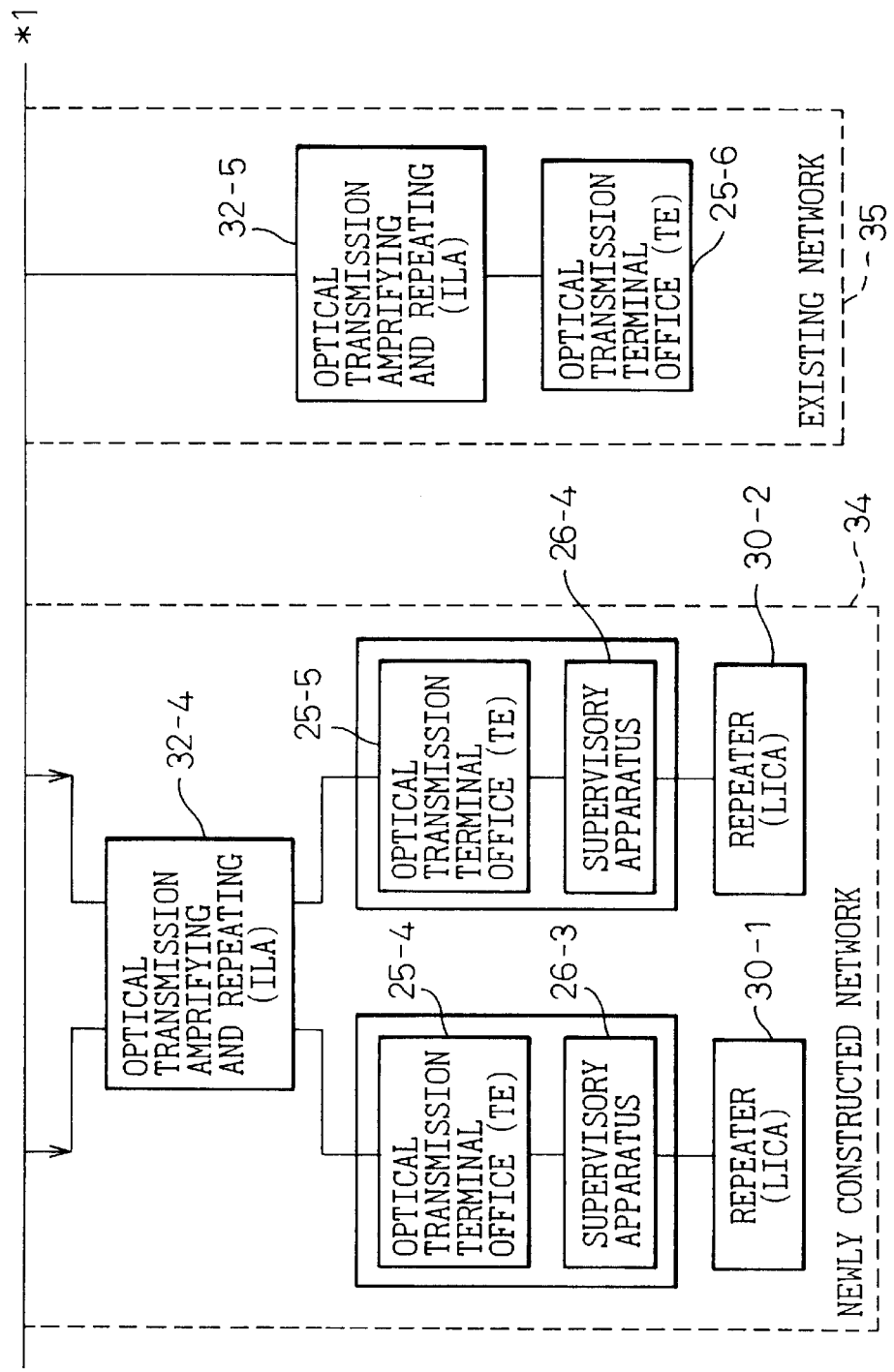

Referring to FIGS. 12A and 12B, an explanation will now be given of the relationship between the repeater (LICA) and maintenance consoles.

The maintenance consoles 31-1 and 31-2 are the same as the terminal 31 shown in FIGS. 3 and 4.

The maintenance console 31-1 prepares a supervisory frame (frame comprised of a header and an application layer frame) corresponding to the repeater (LICA) 30 by the supervisory apparatus 26-1 when a change occurs in the status given from the optical transmission terminal office 25-1 and transmits that supervisory frame to the repeater (LICA) 30.

The repeater (LICA) 30 is connected to the maintenance console 31-1 and is connected to the maintenance console 31-2 through the console network 33.

The maintenance console 31-1 and the maintenance console 31-2 are already provided for supervision of the existing network 35.and are controlled by existing protocol.

The protocol differs from the protocol of the newly constructed network 34.

Therefore, the repeater (LICA) 30, when receiving a supervisory frame (frame comprised of a header and application layer frame) from the supervisory apparatus 26-1 or when there is a request for supervision from the maintenance console 31-1 or maintenance console 31-2, has the function of converting the data format of the supervisory frame, sending a proxy response, performing proxy control, and performing a proxy discard so that the maintenance console 31-1, maintenance console 31-2, and supervisory apparatus 26-1 can receive it.

Conversion of data format

The repeater is given the function of converting the format between the communication data of the maintenance consoles 31-1 and 31-2 and the communication data between the supervisory apparatus 26-1 and the optical transmission terminal office 25-1. The repeater 30 is connected between the maintenance consoles 31-1 and 31-2 and the supervisory apparatus 26-1. By converting the data format, it enables supervision of the supervisory apparatus 26-1 and the optical transmission terminal office 25-1 from the maintenance consoles 31-1 and 31-2.

Proxy response

When the supervisory apparatus 26-1 does not have the function of handling control from the maintenance consoles 31-1 and 31-2, the repeater (LICA) 30 sends back a response informing that the apparatus 26-1 does not support that function to the maintenance consoles 31-1 and 31-2.

Further,by giving the repeater (LICA) 30 a function not present in the supervisory apparatus 26-1, the repeater (LICA) 30 performs processing and returns a response to the maintenance consoles 31-1 and 31-2.

This control is performed from the maintenance consoles 31-1 and 31-2 when starting up the supervisory apparatus 26-1 and the optical transmission terminal office 25-1.

Proxy control

The supervisory apparatus 26-1 requires some control, however, if the maintenance consoles 31-1 and 31-2 have no such means for control, the repeater 30 is given the function corresponding to that control means.

This control is performed at the time of establishment of a session between terminal equipment as shown in FIGS. 9A and 9B and an optical amplifying and repeating apparatus adjoining that terminal equipment.

Proxy discard

The repeater (LICA) 30 discards (i) matter which cannot be processed at the maintenance consoles 31-1 and 31-2 such as alarms/changes in status notified from the supervisory apparatus 26-1 or (ii) control commands notified from the maintenance consoles 31-1 and 31-2 which cannot be processed by the supervisory apparatus 26-1.

Such discard work is performed by time management of the transfer of frames in existing networks, but in the present invention, as explained above, is managed by sequence numbers, so is performed by the repeater (LICA) 30.

Data sort

When the order of control from the maintenance consoles 31-1 and 31-2 differs from the order of control at the supervisory apparatus 26-1, the repeater (LICA) 30 sorts the order of control.

Further, when the order of control of response/notification from the supervisory apparatus 26-1 differs from that of the supervisory apparatus, the repeater (LICA) 30 sorts the order of control.

In the sort operation, the maintenance consoles 31-1 and 31-2 have to be notified individually of the occurrence of an alarm in a certain time and recovery from it in time units. The supervisory apparatus 26-1, however, manages sequence numbers based on the present invention in the supervisory frame generator (CFR) 29, so the data is sorted so as to enable the maintenance consoles 31-1 and 31-2 to handle data for management of the sequence numbers.

Equipment centralization function

When there is a limit to the number of supervisory apparatuses which the maintenance consoles 31-1 and 31-2 can supervise or when limits in hardware of the supervisory lines result in not all of the supervisory apparatuses 26-1 to 26-4 being provided with supervisory lines, a plurality of supervisory apparatuses 26-1 to 26-4 under a repeater (LICA) 30 are made to appear to the maintenance consoles 31-1 and 31-2 as a single supervisory apparatus under the repeater (LICA) 30 to enable supervision of all of the equipment in the network.

Summarizing the effects of the invention, the supervisory apparatus inserts into a frame a sequence number incremented each time a supervisory frame is output, thereby making unnecessary the time management performed by supervisory apparatuses in conventional networks. Due to this, it is possible to reduce the traffic of supervisory frames handled by the supervisory apparatus.

Information for avoiding recirculation added to the reset frame is made variable. That is, equipment receiving a reset frame adds its own equipment number and further sends around the frame. If the reset frame information includes its own equipment number, it recognizes that it already received it and discards the frame, so it is possible to avoid recirculation of the reset frames.

The region for judging if a supervisory frame has already been received is made variable. That is, when starting up equipment, there is only one's own region. Each time a frame is received, however, the necessary region is added. Further, when judging a region to be unnecessary, that region is deleted. As a result, it is possible to construct a system holding just the minimum necessary regions at all times.

While the invention has been described with reference to specific embodiment chosen for purpose of illustration, it should be apparent that numerous modifications could be made thereto by those skilled in the art without departing from the basic concept and scope of the invention.

What is claimed is:

1. A supervisory apparatus, in an optical transmission system having a plurality of transmission lines connecting a plurality of pairs of terminal offices to each other and optical amplifying and repeating apparatuses for performing optical amplifying and repeating operations in the transmission lines, wherein, for a respective optical amplifying and repeating apparatus or terminal office, the supervisory apparatus transmits, to adjoining optical amplifying and repeating apparatuses and terminal offices, supervisory frames while adding sequence numbers thereto which are updated each time a supervisory frame occurs when sending a supervisory frame, detects the sequence number in a supervisory frame to judge if the frame has already been received by said respective optical amplifying and repeating apparatus or terminal office when receiving a supervisory frame from an adjoining optical amplifying and repeating apparatus or terminal office, and thereby produces a judgment result, and in accordance with the judgment result, performs either processing for discarding or recirculating the received supervisory frame or processing for updating the sequence number.

2. A supervisory apparatus as set forth in claim 1, wherein the supervisory apparatus transmits, to adjoining optical amplifying and repeating apparatuses and terminal offices, a supervisory frame including a reset frame for resetting the sequence number at a time of startup of said respective optical amplifying and repeating apparatus or terminal apparatus or at the time of overflow of the sequence numbers.

3. A supervisory apparatus which, for a respective optical communication apparatus connected to adjoining optical communication apparatuses through optical transmission lines, transmits, to the adjoining optical communication apparatuses, supervisory frames while adding sequence numbers thereto which are updated each time a supervisory frame occurs when sending a supervisory frame, detects the sequence number in a supervisory frame to judge if the frame has already been received by said respective optical communication apparatus when receiving a supervisory frame from an adjoining optical communication apparatus, and thereby produces a judgment result, and in accordance with the judgment result, performs either processing for discarding or recirculating the received supervisory frame or processing for updating the sequence number.

4. A supervisory apparatus as in claim 1, further comprising, at a supervisory apparatus side of a new transmission line, a repeater for converting protocol to enable control of an existing transmission line when supervisory protocols differ between the existing transmission line and new transmission line and for termination of control.

5. An optical communication system comprising:

first, second and third optical apparatuses, the first optical apparatus being connected to the second optical apparatus through a first optical transmission line and being connected to the third optical apparatus through a second optical transmission line, each of the first, second and third optical apparatuses being one of an optical amplifier, an optical repeater and a terminal office, wherein the first optical apparatus transmits supervisory frames to the second optical apparatus through the first optical transmission line and to the third optical apparatus through the second optical transmission line, the transmitted supervisory frames including sequence numbers, receives supervisory frames from the second optical apparatus through the first optical transmission line and from the third optical apparatus through the second optical transmission line, the received supervisory frames including sequence numbers; and in accordance with the sequence number of a received supervisory frame, determines whether the received supervisory frame has already been received by the first optical apparatus, and in accordance with the determination, discards or recirculates the received supervisory frame.

6. An optical communication system as in claim 5, wherein, in accordance the determination, the first optical apparatus discards or recirculates the received supervisory frame or updates a sequence number.

7. An optical communication system comprising:

first, second and third optical apparatuses, the first optical apparatus being connected to the second optical apparatus through a first optical transmission line and being connected to the third optical apparatus through a second optical transmission line, each of the first, second and third optical apparatuses being one of an optical amplifier, an optical repeater and a terminal office, wherein the first optical apparatus comprises:

means for transmitting supervisory frames to the second optical apparatus through the first optical transmission line and to the third optical apparatus through the second optical transmission line, the transmitted supervisory frames including sequence numbers, means for receiving supervisory frames from the second optical apparatus through the first optical transmission line and from the third optical apparatus through the second optical transmission line, the received supervisory frames including sequence numbers; and means, in accordance with the sequence number of a received supervisory frame,
- for determining whether the received supervisory frame has already been received by the first optical apparatus, and
- for, in accordance with the determination, discarding or recirculating the received supervisory frame.

8. A method system comprising:

transmitting supervisory frames by a first optical apparatus to a second optical apparatus through a first optical transmission line and by the first optical apparatus to a third optical apparatus through a second optical transmission line, the transmitted supervisory frames including sequence numbers, each of the first, second and third optical apparatuses being one of an optical amplifier, an optical repeater and a terminal office, receiving supervisory frames by the first optical apparatus from the second optical apparatus through the first optical transmission line and by the first optical apparatus from the third optical apparatus through the second optical transmission line, the received supervisory frames including sequence numbers; and in accordance with the sequence number of a received supervisory frame,
- determining by the first optical apparatus whether the received supervisory frame has already been received by the first optical apparatus, and
- in accordance with the determination, discarding or recirculating the received supervisory frame by the first optical apparatus.

* * * * *